United States Patent [19]

Nagashima et al.

[11] Patent Number: 4,866,921
[45] Date of Patent: Sep. 19, 1989

[54] MOWING APPARATUS

[75] Inventors: Akira Nagashima, Kawasaki; Keisuke Ishii, Tokyo, both of Japan

[73] Assignee: Kioritz Corporation, Tokyo, Japan

[21] Appl. No.: 318,278

[22] Filed: Mar. 3, 1989

[30] Foreign Application Priority Data

Mar. 25, 1988 [JP] Japan .............. 63-39392[U]

[51] Int. Cl.[4] .................. A01D 34/10; A01D 34/30; A01D 34/32
[52] U.S. Cl. ................. 56/257; 56/DIG. 17
[58] Field of Search ............ 56/242, 236, 232, 259, 56/260, 261, 264, 275, 297, 158, 123, DIG. 17

[56] References Cited

U.S. PATENT DOCUMENTS 1,647,867  11/1927  Hutsell ........................... 56/259
2,782,586   2/1957  Specht ........................... 56/259 X

FOREIGN PATENT DOCUMENTS 549917   4/1922  France ........................... 56/259
61-21941 7/1986  Japan .

Primary Examiner—Stephen J. Novosad
Attorney, Agent, or Firm—Browdy and Neimark

[57] ABSTRACT

A mowing apparatus has a reciprocating drive portion comprising a casing, a pinion connected to a prime mover, two gears disposed on both sides of the pinion so as to engage therewith, reciprocating rods which are respectively passed through both sides of the casing and which are supported so as to be reciprocable in the lateral direction, and connecting members which are respectively disposed between eccentric pins respectively provided on the gears and the internal ends of the reciprocating rods so as to be movable.

2 Claims, 3 Drawing Sheets

MOWING APPARATUS

BACKGROUND OF THE INVENTION

The present invention relates to a mowing apparatus for use in a mowing machine having two cutter bars which each perform reciprocating motion and which are disposed one on top of the other.

A known mowing machine for mowing grass or the like has two cutter bars which are provided one on top of the other, each performing reciprocating motion, a prime mover such as an internal combustion engine which is disposed at the rear end of an operational rod operated while being held by an operator, and a power transmission shaft which extends from the prime mover in the operational rod and which is connected to a driving force converting mechanism of a reciprocating drive portion at the front end of the operational rod so that the rotational driving force of the power transmission shaft is converted into a reciprocating driving force that is imparted to the upper and lower cutter bars provided in the reciprocating driving portion to cause them to reciprocate in opposite directions. This type of conventional mowing machine suffers, however, from the fact that the driving force-converting mechanism of the mowing apparatus has a tendency to comprise a highly complicated structure with many members, which leads to a tendency for the weight of the apparatus to be considerable. The conventional mowing machine thus involves disadvantages in that smooth operation is inhibited by the unbalanced moment produced in the reciprocating driving portion, and in that the machine exhibits a high degree of power loss and poor durability. In addition, a great deal of time is required when replacing the cutter bars.

SUMMARY OF THE INVENTION

Accordingly, it is an object of the present invention to provide a mowing apparatus which is capable of resolving the above-described problems of the prior art and which has a simple and convenient structure.

To this end, a mowing apparatus of the present invention is provided with a reciprocating drive portion having two cutter bars which are provided one on top of the other in such a manner as to be reciprocable, the reciprocating drive portion comprising a casing, a pinion rotatably supported in the casing and connected to a power transmission shaft extending from a prime mover, two gears respectively disposed on both sides of the pinion so as to engage therewith, reciprocating rods which respectively pass through both sides of the casing and which are so supported as to be reciprocable in the lateral direction, and connecting members for respectively connecting eccentric pins respectively provided on the gears and the internal ends of the reciprocating rods, the cutter bars being respectively connected to the external ends of the reciprocating rods and supported along one side of the casing.

Since the mechanism for transmitting power to each of the cutter bars from the power transmission shaft is disposed in the casing, the mechaism has a strong structure and high durability, and it is not only possible to completely prevent grass and dust from entering the mechanism for transmitting power, but also to prevent malfunctioning of the mowing machine in which the mowing apparatus is provided. In addition, the mechanisms for transmitting power to the cutter bars are symmetrically disposed on both sides of the pinion, and the turning forces of the gears are respectively converted into the reciprocating forces of the reciprocating rods through the connecting members so that the cutter bars are reciprocated. The mowing apparatus of the present invention therefore exhibits an excellent mowing performance and a low degree of power loss because of the smooth conversion of driving force that results from minimization of any undesirable unbalanced moment. It also offers the advantages of allowing for the use of light weight members, and of having a greater facility for the replacement of the cutter bars.

PREFERRED EMBODIMENT OF THE INVENTION

Figure 1:
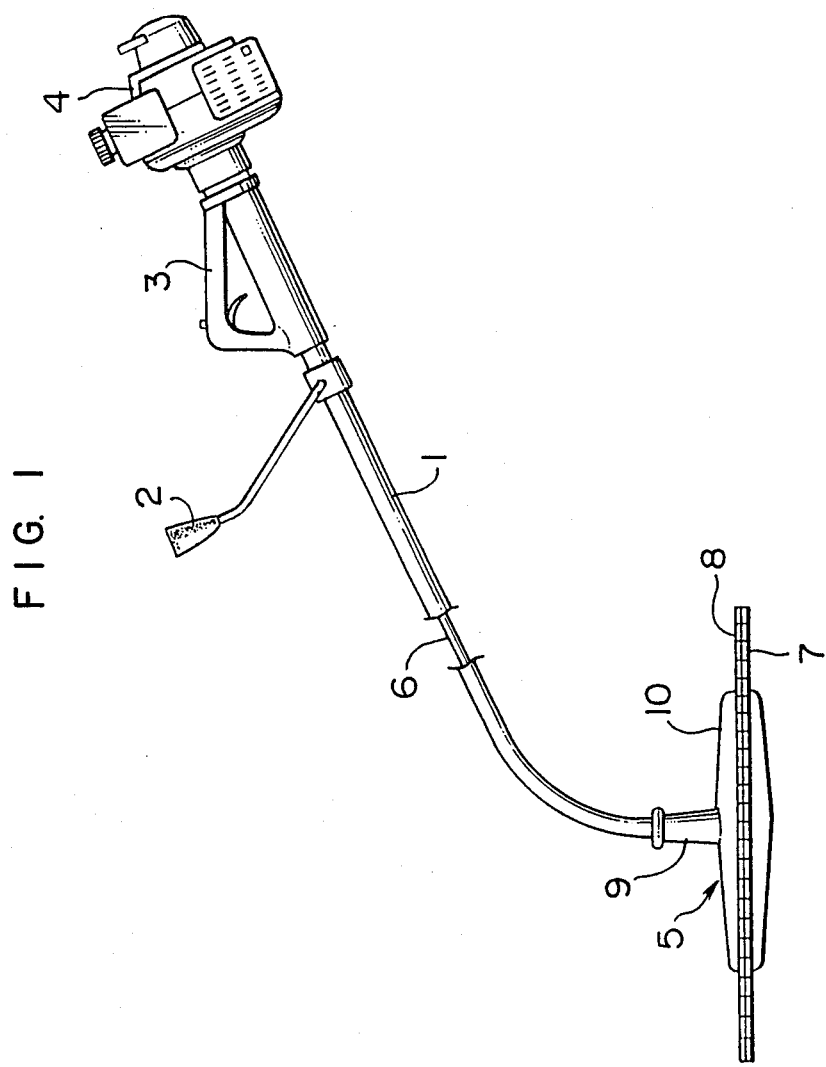
FIG. 1 is a schematic side view of the whole structure of an embodiment of a mowing machine equipped with the mowing apparatus of the present invention in which an operational rod is shown in partially cut away perspective for the purpose of illustrating a power transmission shaft.

The present invention is described below with reference to the embodiment shown in the drawings.

FIG. 1 schematically shows the whole structure of a mowing machine equipped with the mowing apparatus of this embodiment. The mowing machine comprises an operational rod 1 having a long tubular form, a front handle 2 and a rear handle 3 which are used for operating the mowing machine when held by the operator and which are provided on the operational rod 1, a prime mover 4 such as an internal combustion engine which is provided at the rear end of the operational rod 1, a reciprocating drive portion 5 of the mowing apparatus provided at the front end of the operational rod 1, a flexible power transmission shaft 6 which is rotatably supported in the operational rod 1 and which serves to transmit the driving force of the prime mover 4 to the reciprocating drive portion 5, and cutter bars 7 and 8 for mowing grass or the like which are provided one on top of the other in the reciprocating drive portion 5 in such a manner as to be reciprocable in opposite directions.

Figure 2:
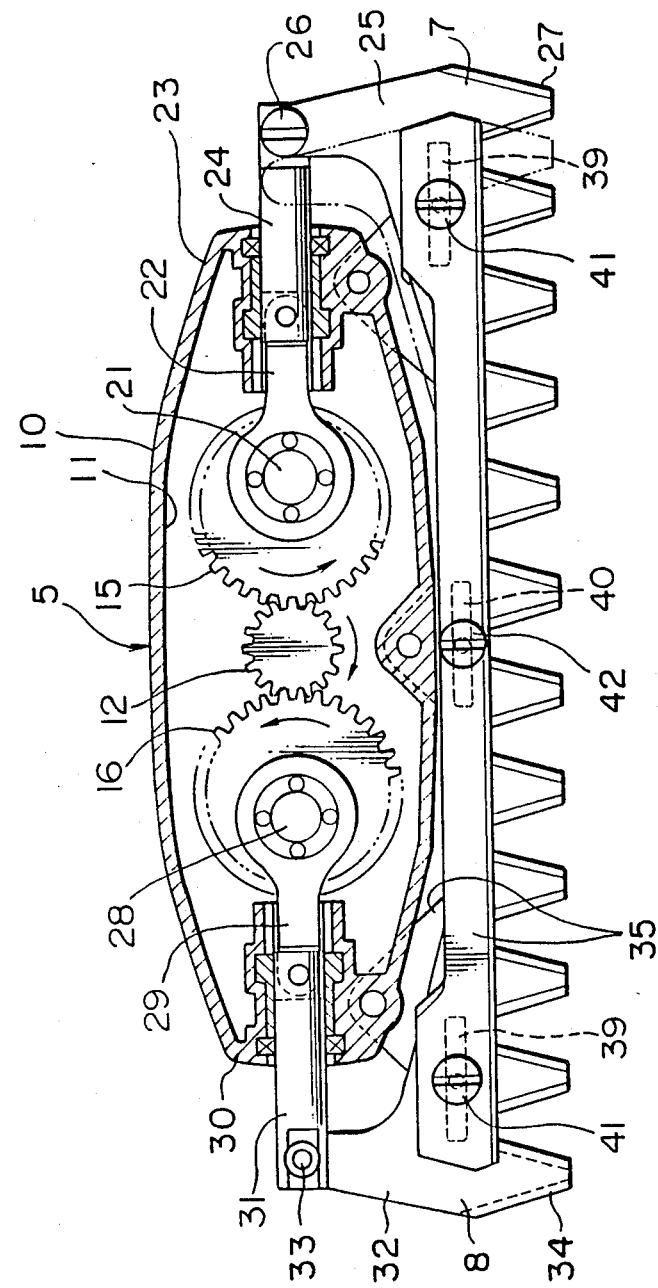
FIG. 2 is a sectional plan view of the reciprocating drive portion shown in FIG. 1.
Figure 3:
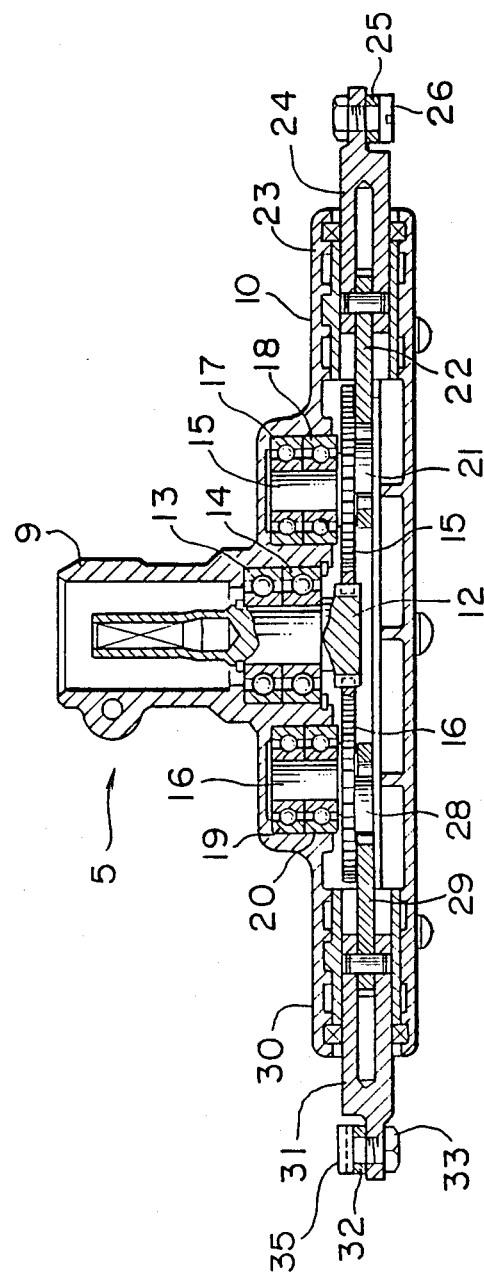
FIG. 3 is a longitudinally sectional view of the reciprocating drive portion shown in FIG. 2.

As shown in FIGS. 2 and 3, the reciprocating drive portion 5 comprises a box-shaped casing 10 having a cylindrical mounting portion 9 which is mounted on the front end of the operational rod 1 and through which the front end of the power transmission shaft 6 extends, the casing 10 being capable of rotating around the operational rod 1. The casing 10 has a driving force-converting mechanism which is provided within the interior thereof and which serves to convert the rotational driving force of the power transmission shaft 6 into the reciprocating driving force that drives the cutter bars 7 and 8. This mechanism comprises a pinion 12 which is connected to the front end of the power transmission shaft 6 and which is rotatably supported by the casing 10 through bearings 13, 14 such as to be rotatable together with the power transmission shaft 6. Gears 15 and 16 are rotataby supported by the casing 10 through bearings 17, 18 and 19, 20, respectively, on both sides of the pinion 12 along the line passing through the center of the pinion 12. These gears 15, 16 are respectively connected to the pinion 12 so that the gear teeth of the former engage with those of the letter. The gears 15, 16 are thus rotated at a reduced speed in the opposite directions during rotation of the pinion 12.

The gear 15 disposed on the right as viewed in FIG. 2 has an eccentric pin 21 which is planted at an eccentric position on its external surface and to which one end of a right hand connecting member 22 is rotatably connected. The other end of the connecting member 22 is rotatably connected to one end, i.e., the internal end, of a reciprocating cylindrical rod 24 which is supported by one side 23 of the casing 10 such as to be slidable in the lateral direction. The other end, i.e., the external end, of the reciprocating rod 24 projects outwardly from the casing 10, one L-shaped end 25 of the lower cutter bar 7 being detachably mounted on that external end by means of a screw 26. The lower cutter bar 7 has a plurality of saw-tooth edges 27 formed on its external side.

Similarly, the left hand gear 16 has a left hand eccentric pin 28 which is planted at an eccentric position on its external surface, which is symmetrical with the right hand eccentric pin 21, with the pinion 21 held therebetween, one end of a left hand connecting member 29 being rotatably connected to the eccentric pin 28. The other end of the connecting member 29 is rotatably connected to one end, i.e., the internal end, of a cylindrical reciprocating rod 31 which is supported by the other side 30 of the casing 10 such as to be slidable in the lateral direction along the axis which is the same as that of the right hand reciprocating rod 24. The other end, i.e. the external end, of the reciprocating rod 31 outwardly projects from the casing 10, the other L-shaped end 32 of the upper cutter bar 8 being detachably mounted on that external end by means of a screw 33. The upper cutter bar 8 has a plurality of saw-tooth edges 34 formed on its external side. The upper and lower cutter bars 7, 8 are disposed back to back in contact with each other and put into reciprocating motion while sliding in the opposite lateral directions, thereby cutting grass or the like by virtue of the engagement between the saw-tooth edges 27 and 34.

The casing 10 has two thin and long guide members 35 which are fixed to one side thereof by means of screws (not shown), which extend in the lateral direction in parallel with the axis of the reciprocating rods 24 and 31 and which hold the two cutter bars 7 and 8 therebetween so as to guide the movements of those cutter bars. Each of the two cutter bars 7, 8 has two lateral slots 39 which are formed at both ends thereof and a lateral slot 40 which is formed in their central portions. Threaded pins 41 and 42 which are screwed into each of the guide members 35 are respectively passed through the slots 39 and 40 so that the cutter bars 7 and 8 are guided and supported so as to be able to perform reciprocating-sliding motion in the lateral direction.

What is claimed is:

1. A mowing apparatus provided with a reciprocating drive portion having two cutter bars which are provided one on top of the other in such a manner as to be reciprocable, said reciprocating drive portion comprising a casing, a pinion rotatably supported in said casing and connected to a power transmission shaft extending from a prime mover, two gears respectively disposed on both sides of said pinion so as to engage therewith, reciprocating rods which are respectively passed through both sides of said casing and which are so supported as to be reciprocable in the lateral direction, and connecting members which are respectively interposed between eccentric pins respectively provided on said gears and the internal ends of said reciprocating rods so as to be movable, said cutter bars being respectively connected to the external ends of said reciprocating rods and supported along one side of said casing.

2. A mowing apparatus according to claim 1, wherein said cutter bars are guided and supported while being held by two thin and long guide members so as to perform reciprocating-sliding motion in the lateral direction.

* * * * *